United States Patent
Fox et al.

(10) Patent No.: US 7,417,748 B2
(45) Date of Patent: Aug. 26, 2008

(54) METHOD AND APPARATUS FOR MEASURING DIMENSIONAL CHANGES IN TRANSPARENT SUBSTRATES

(75) Inventors: Richard L. Fox, Corning, NY (US); Kiat C. Kang, Corning, NY (US); Andru J. A. Prescod, Corning, NY (US)

(73) Assignee: Corning Incorporated, Corning, NY (US)

( * ) Notice: Subject to any disclaimer, the term of this patent is extended or adjusted under 35 U.S.C. 154(b) by 643 days.

(21) Appl. No.: 11/118,724

(22) Filed: Apr. 28, 2005

(65) Prior Publication Data

US 2006/0247891 A1 Nov. 2, 2006

(51) Int. Cl.
*G01B 11/14* (2006.01)
*G01N 21/86* (2006.01)

(52) U.S. Cl. ............... 356/625; 250/559.29; 250/237 R (58) Field of Classification Search ................. 356/625; 250/559.29, 559.44, 216, 237 R, 237 G; 422/82.05; 439/107, 113
See application file for complete search history.

(56) References Cited

U.S. PATENT DOCUMENTS

| | | | | |
|---|---|---|---|---|
| 4,223,257 A | * | 9/1980 | Miller | .................. 318/594 |
| 4,629,313 A | * | 12/1986 | Tanimoto | .................. 355/53 |
| 4,998,239 A | * | 3/1991 | Strandjord et al. | ........ 369/275.1 |
| 5,361,132 A | * | 11/1994 | Farn | .................. 356/509 |
| 5,721,435 A | * | 2/1998 | Troll | .................. 250/559.29 |
| 5,936,688 A | * | 8/1999 | Tsuda et al. | .................. 349/113 |
| 6,712,659 B2 | * | 3/2004 | Chen et al. | .................. 445/3 |
| 7,115,232 B2 | | 10/2006 | Hudson | |

FOREIGN PATENT DOCUMENTS

| JP | 09244266 A | * | 9/1997 |
|---|---|---|---|
| JP | 10104033 A | * | 4/1998 |
| JP | 2004205407 A | * | 7/2004 |

* cited by examiner

*Primary Examiner*—Sang Nguyen
(74) *Attorney, Agent, or Firm*—Adenike Adebiyi; Siwen Chen (57) ABSTRACT

A method of measuring dimensional changes in a transparent substrate includes forming an array of reference markers on a reference plate, forming an array of substrate markers on the transparent substrate, stacking the reference plate and transparent substrate such that the reference markers and substrate markers overlap, measuring coordinates of the substrate markers relative to coordinates of the reference markers before and after processing the transparent substrate, and determining dimensional changes in the transparent substrate from the difference between the measured relative coordinates of the substrate markers before and after processing the transparent substrate.

20 Claims, 7 Drawing Sheets

METHOD AND APPARATUS FOR MEASURING DIMENSIONAL CHANGES IN TRANSPARENT SUBSTRATES

FIELD OF THE INVENTION

The invention relates generally to measurement of dimensional changes in a transparent substrate resulting from processing of the transparent substrate.

BACKGROUND OF THE INVENTION

Transparent substrates such as glass substrates find many uses in devices requiring transmission or detection of light. Examples of these devices include, but are not limited to, flat panel displays, active electronic devices, photovoltaic devices, and biological arrays. Processing of a transparent substrate into a form that is useful for a specific device may induce dimensional changes in the transparent substrate. Examples of such processing include, but are not limited to, cutting the transparent substrate and heating the transparent substrate above room temperature. Cutting of a glass substrate may result in distortion of the glass substrate due to release of internal stress from the glass substrate. Heating a glass substrate above room temperature may result in shrinkage or expansion of the glass substrate. Distortion, shrinkage, expansion and other types of dimensional changes can be problematic in devices such as listed above, in particular, arrayed devices. Manufacturers typically require transparent substrates incorporated in arrayed devices to have dimensional changes within a prescribed limit. As an example, AMLCD (active matrix liquid crystal display) device manufacturers typically require that glass substrates incorporated in AMLCD devices have a distortion less than several microns after processing. These dimensional requirements are expected to become even more stringent as AMLCD technology and manufacturing advances.

Measurement systems based on absolute coordinate system (typically using interferometry) are currently used to measure dimensional changes in a transparent substrate. In absolute measurement, the transparent substrate being measured is marked with a series of reference marks. The reference marks are pre-characterized in X-Y position locations before processing the substrate. After processing the substrate, the substrate is then placed back on the measurement system and the X-Y reference structures are re-characterized. The dimensional changes are indicated by change in X-Y position of the reference structures before processing versus X-Y position of the reference structures after processing. Absolute measurement systems are likely to have large measurement errors as the measured area gets larger.

From the foregoing, a method of measuring dimensional changes in a transparent substrate is desired. Such measurements can be used to ascertain that the transparent substrate has dimensional changes within a prescribed limit. Such measurements can also be used to fine-tune the composition of the transparent substrate as well as the processing steps resulting in dimensional changes in the transparent substrate. As the AMLCD industry gears towards large size substrates, a method of measuring dimensional changes over large substrate areas, e.g., more than 2 m long, with high resolution, e.g., submicron resolution, is also desired.

SUMMARY OF THE INVENTION

In one aspect, the invention relates to a method of measuring dimensional changes in a transparent substrate which comprises forming an array of reference markers on a reference plate, forming an array of substrate markers on the transparent substrate, stacking the reference plate and transparent substrate such that the reference markers and substrate markers overlap, measuring coordinates of the substrate markers relative to the coordinates of the reference markers before and after processing the transparent substrate, and determining dimensional changes in the transparent substrate from the difference between the measured relative coordinates of the substrate markers before and after processing the transparent substrate.

In another aspect, the invention relates to a system of measuring dimensional changes in a transparent substrate which comprises a reference plate, a platform providing rigid support to the reference plate, an imaging device which captures images of markers on the reference plate and on the transparent substrate when stacked against the reference plate, and a positioning device coupled to the imaging device to place the imaging device at desired locations across the platform.

Other features and advantages of the invention will be apparent from the following description and the appended claims.

DETAILED DESCRIPTION OF THE INVENTION

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

Figure 1A:
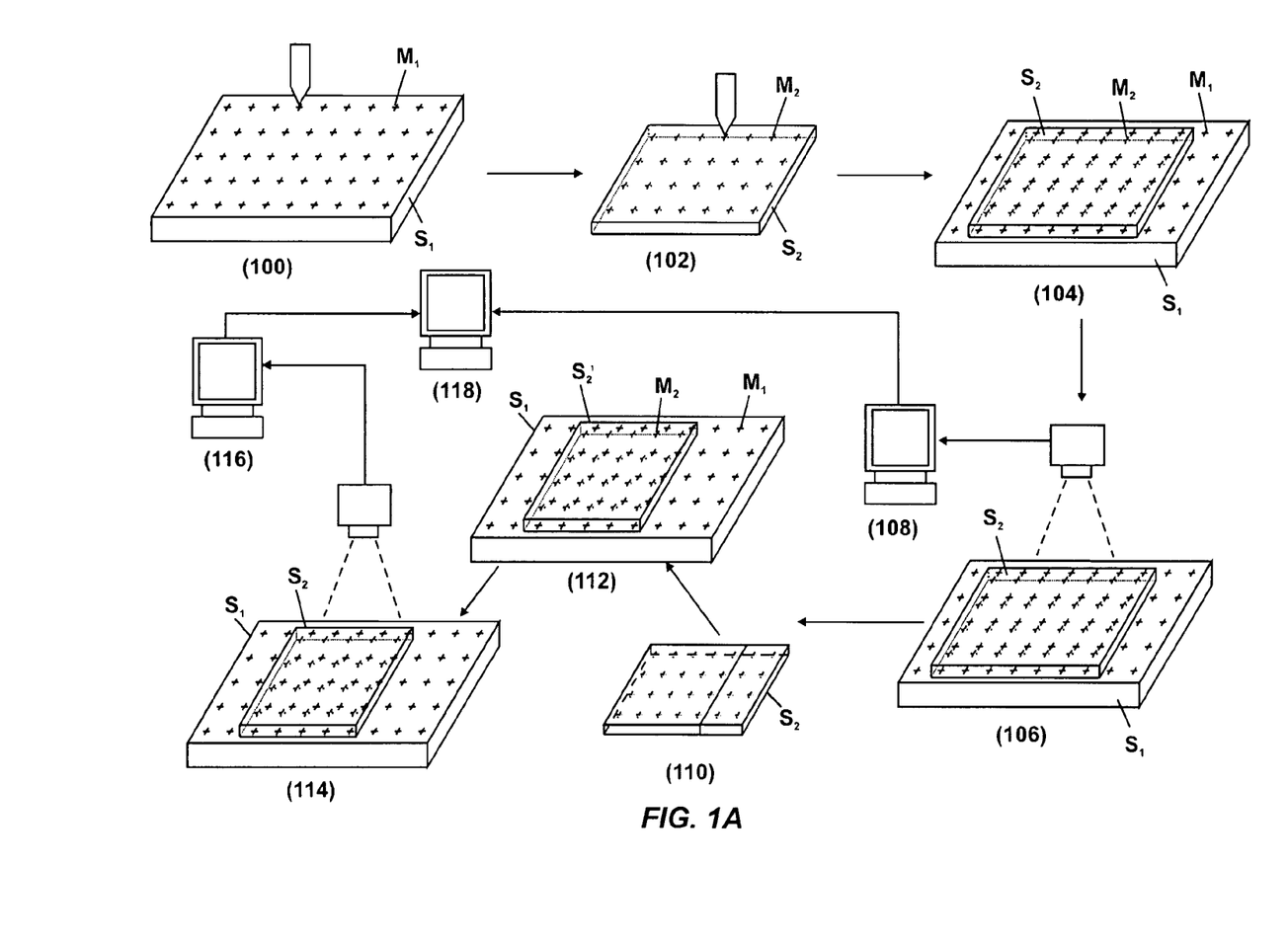
FIG. 1A illustrates a method of measuring dimensional changes in a transparent substrate according to one embodiment of the invention.

FIG. 1A is a flowchart illustrating a method of measuring dimensional changes in a transparent substrate, such as a glass substrate, according to one embodiment of the invention. The method involves forming an array of markers $M_1$ on a reference plate $S_1$ (100). The makers $M_1$ act as fixed local rulers against which dimensional changes in a transparent substrate will be measured. The reference plate $S_1$ is not subjected to any processing steps that can result in changes in its dimensions. The method also involves forming an array of markers $M_2$ on a transparent substrate $S_2$ (102). The array of markers $M_2$ on the transparent substrate $S_2$ is equivalent or similar in terms of marker distribution and shape to the array of markers $M_1$ on the reference plate $S_1$. The method further includes stacking the transparent substrate $S_2$ and the reference plate $S_1$ such that the array of markers $M_2$ on the transparent substrate $S_2$ and the array of markers $M_1$ on the reference plate $S_1$ overlap (104). Such stacking may include placing the transparent substrate $S_2$ above (or on top of) the reference plate $S_1$ or placing the reference plate $S_1$ above (or on top of) the transparent substrate $S_2$.

Figure 1B:
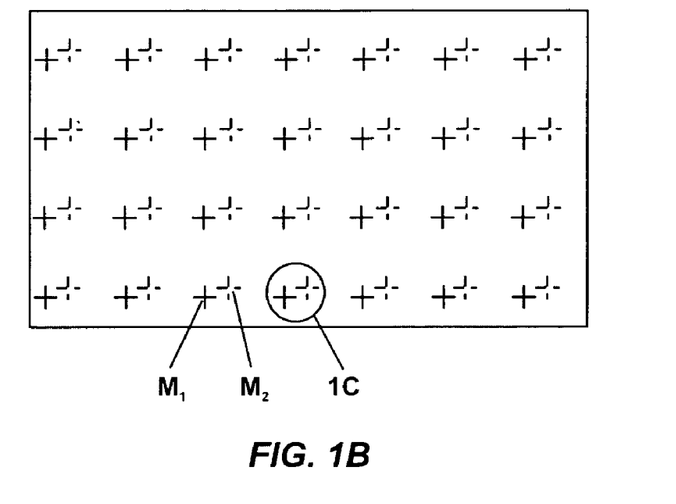
FIG. 1B shows a marked transparent substrate positioned on top of a reference plate according to one embodiment of the invention.
Figure 1C:
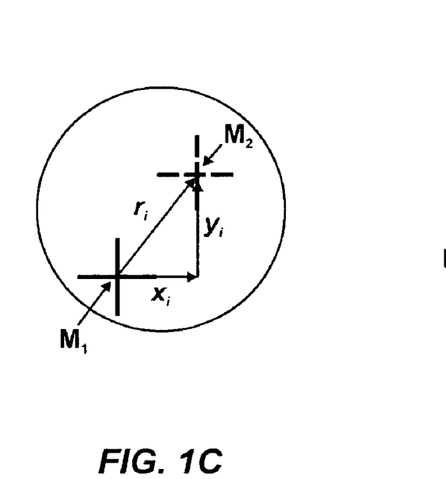
FIG. 1C illustrates coordinate of a substrate marker relative to a reference marker.

The method further includes obtaining an image of the stacked reference markers $M_1$ and substrate markers $M_2$ using a suitable imaging system (106). This step is referred to as a first measurement look, and the image obtained is referred to as a first measurement image. The first measurement image may be a single image or may be an array of images, e.g., if the reference markers $M_1$ and substrate markers $M_2$ are captured on a node-by-node basis. The method also includes processing the first measurement image to determine the initial coordinate $(x_i, y_i)$ of each substrate marker $M_2$ relative to a corresponding one of the reference markers $M_1$ (108). The corresponding one of the reference markers $M_1$ is typically the closest reference marker $M_1$. FIG. 1B shows a representation of the first measurement image, which is composed of reference and substrate markers $M_1$, $M_2$. FIG. 1C illustrates the coordinate $(x_i, y_i)$ of a substrate marker $M_2$ relative to a reference marker $M_1$.

Returning to FIG. 1A, after obtaining the first measurement image, the transparent substrate $S_2$ is separated from the reference plate $S_1$ and processed (110). Such processing may include, for example, cutting the transparent substrate $S_2$ and/or heating the transparent substrate $S_2$ to an elevated temperature. After processing the transparent substrate $S_2$, the transparent substrate $S_2$ and the reference plate $S_1$ are stacked so that the substrate markers $M_2$ and reference markers $M_1$ overlap and are visible from a position above the transparent substrate $S_2$ (112). The method includes obtaining an image of the reference markers $M_1$ and substrate markers $M_2$ on the reference plate $S_1$ and transparent substrate $S_2$, respectively, using an imaging system (114). This step is referred to as a second measurement look, and the image obtained is referred to as a second measurement image. The method also includes processing the second measurement image to determine the final coordinate $(x_f, y_f)$ of each substrate marker $M_2$ relative to a corresponding one of the reference markers $M_1$ (116).

The method further includes computing the differences between the initial and final coordinates of each node (represented by a substrate marker $M_2$) on the transparent substrate $S_2$ (118). These differences represent local dimensional differential changes in the transparent substrate $S_2$ from the first measurement look. The orientation and position of the transparent substrate $S_2$ relative to the reference plate $S_1$ during the first measurement look will more than likely be different from the orientation and position of the transparent substrate $S_2$ relative to the reference plate $S_1$ during the second measurement look. In one embodiment, the method includes correcting for errors in measurement of the dimensional changes in the transparent substrate $S_2$ due to differences in positioning of the transparent substrate $S_2$ relative to the reference plate $S_1$ in the first and second measurement looks.

Figure 1D:
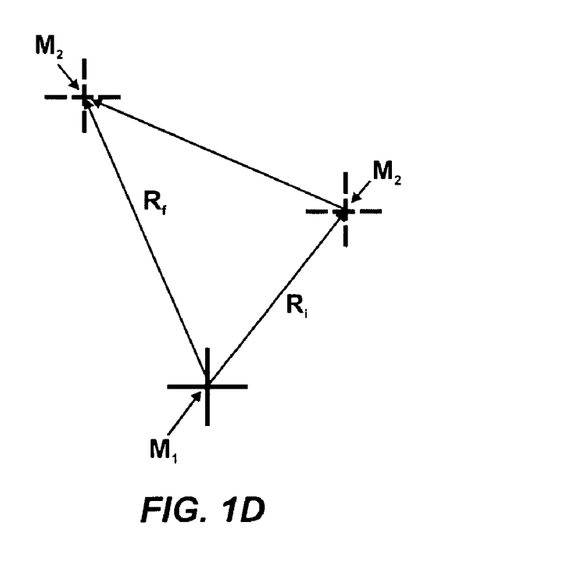
FIG. 1D illustrates initial and final position of a substrate marker relative to a reference marker.

Assuming that the transparent substrate $S_2$ is rigid and that the rigid body movement error is larger than the process dimensional change, then the rotation and translation error can be resolved mathematically. FIG. 1D shows a graphical representation of the initial position $R_i$ and the final position $R_f$ of a substrate marker $M_2$ relative to a reference marker $M_1$. For each substrate marker:

$$R_f - R_i = RT + D + E \quad (1)$$

where $R_f$ is the measured final position, $R_i$ is the measured initial position, RT is rotation/translation of rigid body, D is dimensional changes in the substrate caused by a given process, and E is measurement error. For an array of markers:

$$\{R_f - R_i\} = \{RT\} + \{r\} \quad (2)$$

where $\{\ \}$ represents a matrix and r represents residuals, i.e., dimensional changes. $R_f$ and $R_i$ are known. RT and r can be determined using any suitable technique for solving simultaneous equations, for example, linear regression. The intent of this rigid body compensation is to return the second look measurement back to the original location of the first measurement look.

Returning to FIG. 1A, the quality of the measurements made may be affected by the flatness of the reference plate $S_1$. Flatness refers to the waviness of the reference plate $S_1$. If the reference plate $S_1$ is not sufficiently flat, the reference plate $S_1$ and transparent substrate $S_2$ may not be in continuous contact, causing a potential air gap or wrinkle between the reference plate $S_1$ and transparent substrate $S_2$, which can affect reproducibility of measurements. Thus, it is preferable that the reference plate $S_1$ is made from a substrate with excellent flatness. In one embodiment, the flatness of the reference plate $S_1$ is no greater than 100 μm and may be between 10 and 100 μm. This flatness requirement is over a specific area, typically 100 mm² square area.

Preferably, the reference plate $S_1$ is not prone to warping due to inner stress or thermal stress of the transparent substrate $S_2$ when in contact with the transparent substrate $S_2$. To reduce sensitivity of the measurements to temperature variations, the reference plate $S_1$ preferably has a coefficient of thermal expansion (CTE) that is similar (i.e., equal or close) to that of the transparent substrate $S_2$. When the transparent substrate $S_2$ is an AMLCD glass, borosilicate material or AMLCD glass could be used as the reference plate $S_2$. When the reference plate $S_1$ is positioned above (or on top of) the transparent substrate $S_2$, the reference plate $S_1$ should be transparent to allow viewing of the markers $M_2$ on the transparent substrate $S_2$ from a position above the transparent substrate $S_2$.

Other criteria for selecting the reference plate $S_1$ will depend at least in part on the type of sensors used to make the measurements. In general, the reference plate $S_1$ is preferably stable over time. When an imaging system using optical lenses is used in making the measurements, it is preferable that the reference plate $S_1$ has a smooth glass surface with minimal macro- and micro-scratches, since such scratches could affect the quality of the measurement images. For large-size measurement, the reference plate $S_1$ should be sufficiently rigid so that it does not break during handling. If the reference plate $S_1$ is made of multiple pieces, mechanical and thermal stability of the pieces should be ensured over time. Further, flatness requirement should be met, particularly at the adjoining edges.

The markers $M_1$, $M_2$ formed on the reference plate $S_1$ and the transparent substrate $S_2$, respectively, can have a wide variety of geometrical or non-geometrical shapes. FIGS.

Figure 2A:
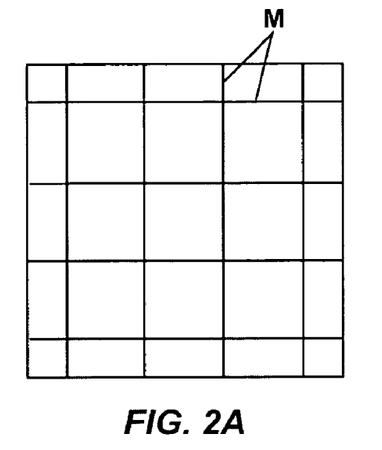
FIGS. 2A-2D show examples of markers suitable for use in the invention.
Figure 2B:
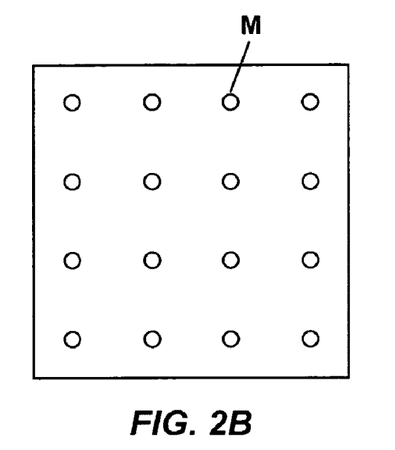
Figure 2C:
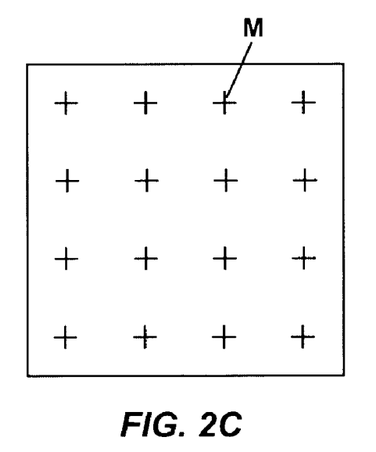
Figure 2D:
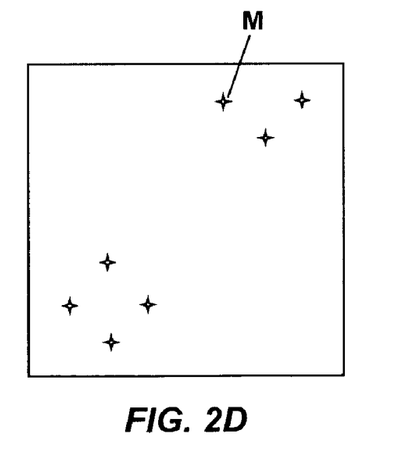

2A-2D show examples of markers M suitable for use in the invention. In FIG. 2A, the markers M are lines. In FIG. 2B, the markers M are circles. In FIG. 2C, the markers M are crosses. In FIG. 2D, the markers M are dots. The markers M may be placed uniformly on the reference plate and transparent substrate, i.e., the spacing between the markers is uniform, or may be placed randomly on the reference plate and transparent substrate, i.e., the spacing between the markers is non uniform. For example, the markers M in the FIGS. 2A-2C are placed uniformly whereas the markers M in FIG. 2D are placed randomly. The markers can be placed on the reference plate and transparent substrate using any suitable marking system, such as an ink marking system, scribing system, lithography tools, or laser marking system. The markers on the transparent substrate would have to be able to survive any processing steps that the transparent substrate would be subjected to between the first measurement look and the second measurement look.

Figure 3A:
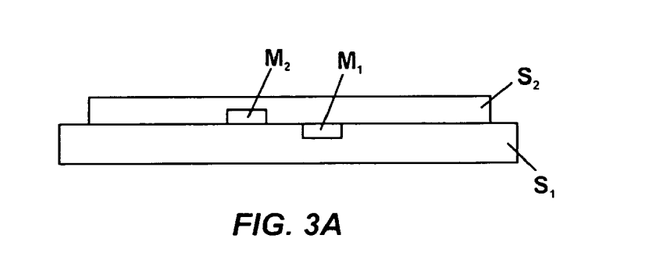
FIGS. 3A and 3B show substrate and reference markers in a single focal plane configuration according to one embodiment of the invention.
Figure 3B:
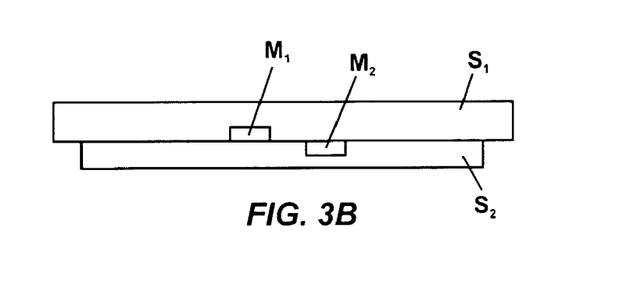
Figure 4A:
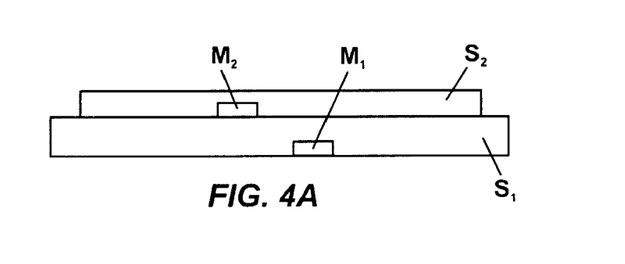
FIGS. 4A-4F show substrate and reference markers in a dual focal plane configuration according to another embodiment of the invention.
Figure 4B:
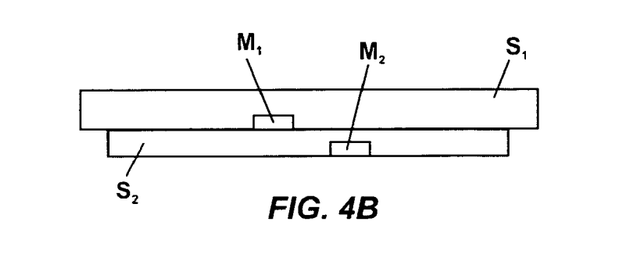
Figure 4C:
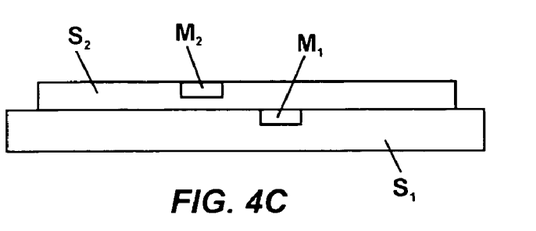
Figure 4D:
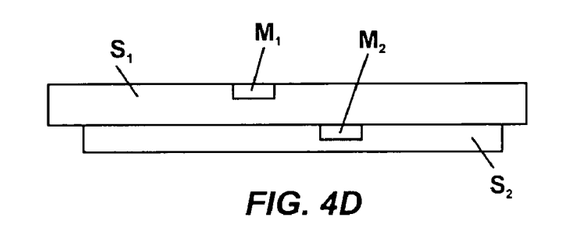
Figure 4E:
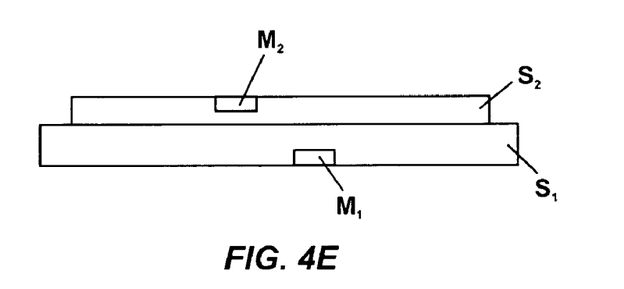
Figure 4F:
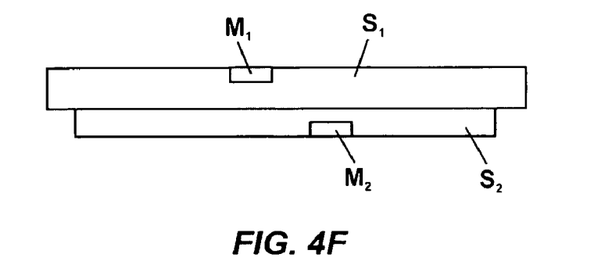

Returning to FIG. 1A, the position of the reference plate $S_1$ can be above or below the transparent substrate $S_2$. The reference plate $S_1$ and transparent substrate $S_2$ can be positioned such that the markers $M_1$, $M_2$ are in a single focal plane or in a dual focal plane. In the single focal plane configuration, the reference and substrate markers $M_1$, $M_2$ lie in the same plane, and an imaging system having a single focus is suitable for capturing an image of the markers. In the dual focal plane configuration, the reference and substrate markers $M_1$, $M_2$ lie on different planes. FIGS. 3A and 3B illustrate reference and substrate markers $M_1$, $M_2$ in a single focal plane configuration. Flipping of the reference plate $S_1$ or transparent substrate $S_2$ after marking is required to place the markers on the same plane. Flipping large transparent substrates without damaging them may be challenging. FIGS. 4A-4D illustrate reference and substrate markers $M_1$, $M_2$ in a dual focal plane configuration. The dual focal plane configuration allows the reference plate and transparent substrate to be marked and measured without manipulating the orientation of the reference plate or transparent substrate on the measurement system.

For the dual focal plane configuration, there are a variety of approaches to capturing the markers on the different planes. One approach involves capturing both planes within the same depth of focus. In this approach, the thickness of the measured substrate influences the depth of focus. As the depth of focus increases, the efficiency of light collection by the imaging system decreases. A potential way to increase the contrast is by implementing higher integration rate time for each measurement image. A second approach involves capturing two planes in two separate time frames. One example of implementing the second approach includes capturing the two planes at a first Z-position of the imaging system and capturing the two planes at a second Z-position of the imaging system. Another example of implementing the second approach includes using different focusing lenses at different times to capture each plane. A third approach to capturing the markers on different planes involves capturing both planes simultaneously using an imaging system having two focal planes.

Figure 5A:
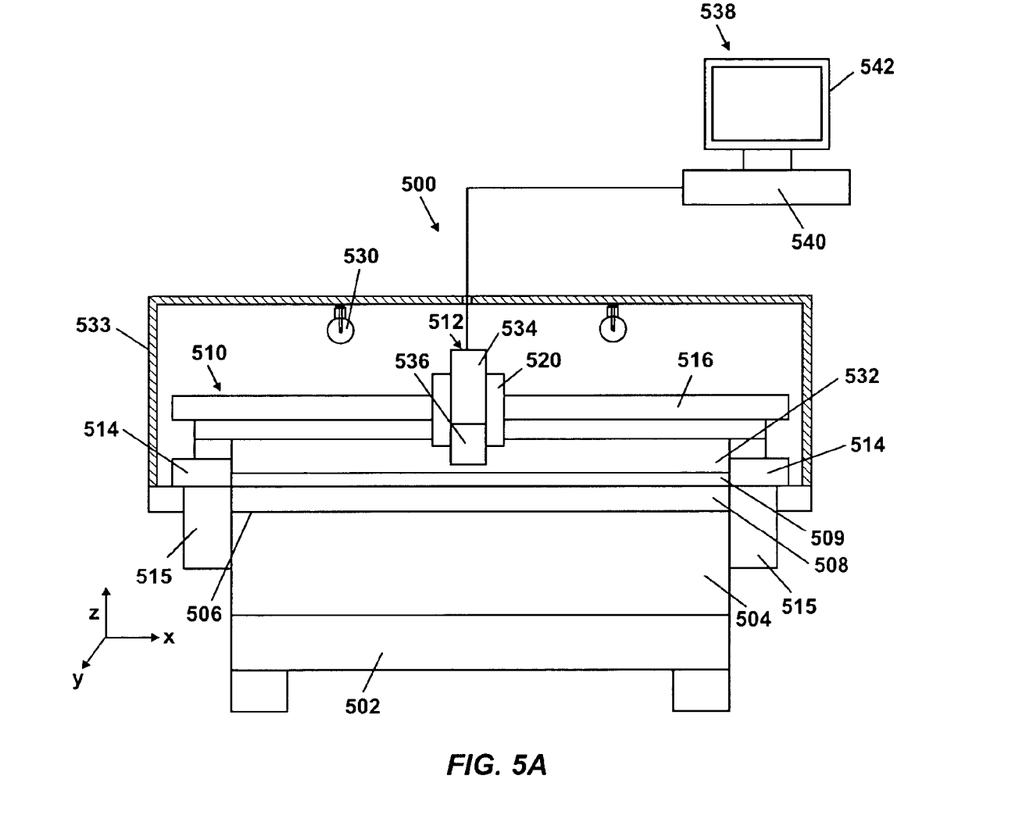
FIGS. 5A-5C illustrate a system for measuring dimensional changes in a transparent substrate according to one embodiment of the invention.
Figure 5B:
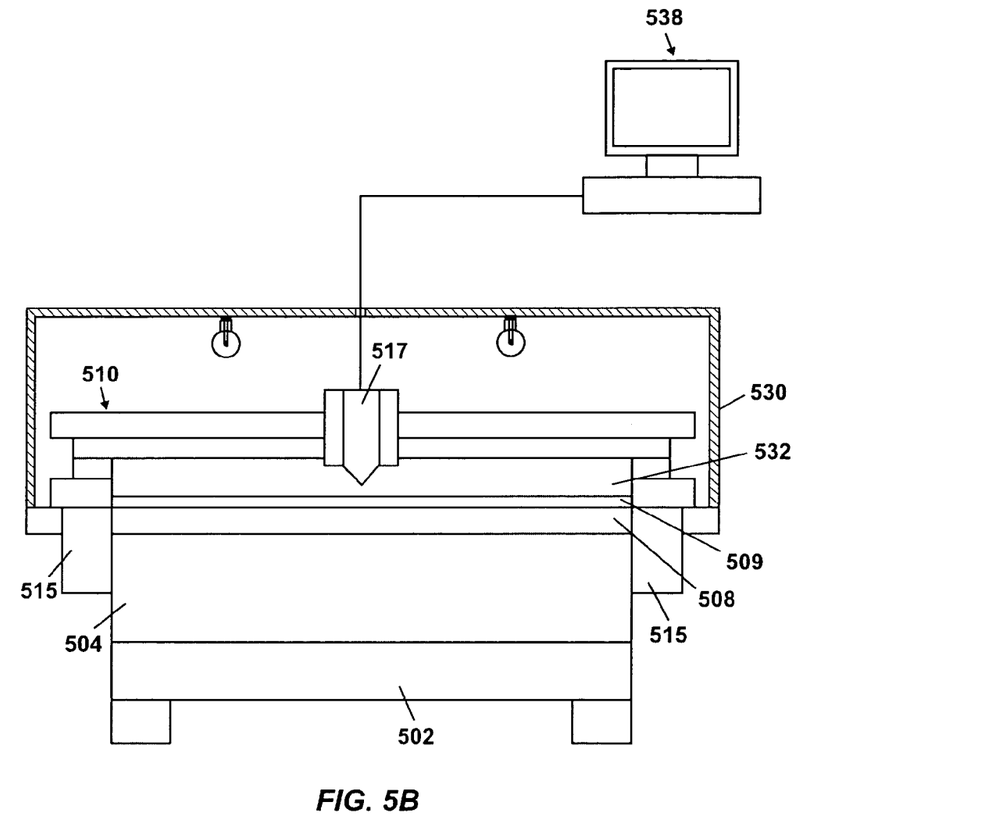

FIG. 5A shows a system 500 for measuring dimensional changes in a transparent substrate according to one embodiment of the invention. The system 500 includes a support structure 502, which rigidly supports a worktable 504. The support structure 502 is preferably a vibration isolation table, i.e., one equipped with passive and/or active vibration isolators to eliminate harmonic and non-harmonic vibration frequencies. The worktable 504 provides a platform 506, which rigidly supports a reference plate 508 and a transparent substrate 509. The platform 506 preferably has excellent flatness. For example, the flatness of the platform 506 may be no greater than 100 µm or may be between 10 and 100 µm. Frames 515 are attached to the sides of the worktable 504. The frames 515 support a positioning device 510. The positioning device 510 is capable of moving objects attached to it, such as an imaging system 512 or marking system (517 in FIG. 5B), across the worktable 504. The worktable 504 should be strong enough to support the positioning device 510 and other equipment attached to the positioning device 510 without excessive vibration. The worktable 504 should have high stiffness so as to avoid dynamic deflection as the positioning device 510 travels across the worktable 504, particularly when the measurement area is large, e.g., on the order of 2 m long. The worktable 504 may be made of granite material and the like.

The positioning device 510 may be an xy stage or xyz stage or gantry or Cartesian robot or other device capable of providing motion along at least two orthogonal directions. Preferably, the positioning device 510 is capable of micro-movements. Preferably the positioning device 510 is capable of micro-movements over large areas, e.g., greater than 2 m. Preferably, the positioning device 510 has a stiffness as it approaches a node within reason, with each step including marking, measurements, and, if needed, glass handling. For illustration purposes, the positioning device 510 may include linear stages 514 supported on the frames 515. The linear stages 514 may provide linear motion along the y direction. The positioning device 510 may further include a linear stage 516 having ends supported on the linear stages 514. The linear stage 516 may provide linear motion along the x direction. The imaging system 512 may be supported by a frame 520 coupled to the linear stage 516. In an alternative embodiment, the frame 520 may be replaced with a linear stage that provides linear motion along the z direction, allowing the z-position of the imaging system 512 relative to the worktable 504 to be adjustable. Alternatively, linear stages that provide linear motion along the z direction may be provided between the ends of the linear stage 516 and the linear stages 514 to allow the z-position of the linear stage 516 relative to the table 504 to be adjustable.

Figure 5C:
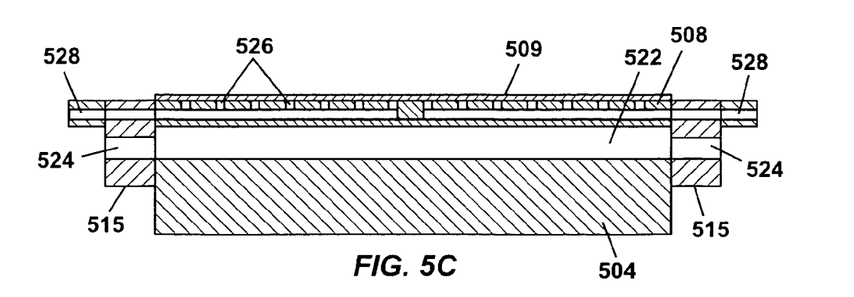

The system 500 preferably includes a mechanism or method of clamping the reference plate 508 to the worktable 504, at least in the configuration where the reference plate 508 is in contact with the worktable 504. The clamping method may involve use of mechanical devices, such as C-clamps. However, such clamps may interfere with placement of the transparent substrate 509 on the reference plate 508. An alternate method is to use vacuum clamping. FIG. 5C illustrates a vacuum clamping system suitable for use in the invention. In one embodiment, linear grooves 522 are formed in the worktable 504. One or more ports 524 are also formed in the frames 515 attached to the sides of the worktable 504. The ports 524 can communicate with the linear grooves 522. The reference plate 508 can be clamped to the worktable 504 by connecting the ports 524 to a vacuum source and sucking air out of the linear grooves 522. The reference plate 508 may also include holes 526 which communicate with another set of ports 528 in the frames 515. The holes 526 can be connected to a vacuum source via the ports 528 to allow vacuum-clamping of the transparent substrate 509 to the reference plate 508. Isolated groups of holes 526 that can be independently connected to vacuum source(s) can be formed so that vacuum clamping can be selectively provided across the reference plate 508. This is useful because the size of the transparent substrate 509 can be variable and may not cover all the holes on the reference plate 508. The isolated groups of holes 526 would allow vacuum-clamping area to be matched to the transparent substrate size. When it is desired to remove the transparent substrate 509 from the reference plate 508, air may be pumped into the holes 526 through the ports 528 to release the transparent substrate 509. An alternative to vacuum clamping includes, but is not limited to, electrostatic chucking, wherein the transparent substrate 509 and/or the reference plate 508 is held down by difference charges.

Returning to FIG. 5A, the imaging system 512 typically includes a camera 534. In one embodiment, the camera 534 uses a CCD ("charge-coupled device") sensor as a light sensor. However, the invention is not limited to use of a CCD sensor as the light sensor. A CMOS sensor or other solid-state sensor may also be used. In the embodiment where the light sensor is a CCD sensor, it includes an array of light-sensitive cells called photosites. These photosites are typically made of silicon and emit electrons when light impinges on them. Each photosite may have an associated color filter to allow the CCD sensor to detect colors. The imaging system 512 typically also includes an optical system 536. The optical system 536 may include one or more lenses for focusing light coming from an object, such as markers on the reference plate 508 or transparent plate 509, on the light sensor in the camera 534. The lenses preferably have low distortion and aberration. The imaging system 512 may also include a zooming feature, which may be achieved optically through the optical system 536 or digitally through the camera 534. The imaging system 512 may also include a processor that controls its operation and processes information collected by the light sensor in the camera 534 into image files. The processor may support various types of image file formats, such as TIFF and JPEG. The imaging system 512 may also include memory for storing the image files.

The system 500 may include one or more illuminators 530 for illuminating the measurement area 532. Illumination can be provided from above or below the worktable 504. Two very common illumination techniques include dark field and bright field illumination. The camera 534 makes images based on the light reflected from the measurement area 532. The system 500 also includes a computer system 538 for controlling motion of the positioning device 510 so that desired portions of the reference plate 508 and transparent substrate 509 can be imaged using the imaging system 512. The computer system 538 typically includes a processor 540 and a video monitor 542 and other peripheral devices (not shown) necessary for interacting with the system, such as a keyboard and mouse. These peripheral devices are well known in the art and will not be discussed further. The computer system 538 may receive image files from the imaging system 512 and process the image files. For example, the processor 540 may execute an algorithm that computes the coordinates of substrate markers relative to reference markers. The processor 540 may further execute an algorithm that computes the dimensional changes in the transparent substrate 509 based on first and measurement looks, including compensating for rotation and translation error due to placement of the transparent substrate 509 relative to the reference substrate 508.

Because the measurements are sensitive to temperature, it is preferable that the system 500 includes a temperature-controlled chamber 533 for enclosing the measurement area 532. As an example, the temperature-controlled chamber 533 is capable of maintaining a desired temperature to ±0.01° C. with steady-state air flow. However, the cost of meeting such temperature requirements may be prohibitive with large substrates. In this case, the temperature requirements may be relaxed. For instance, if an AMLCD glass is used as the transparent substrate, the large surface area enables the substrate to adapt its temperature to its environment very quickly. If the supporting structure is a large mass, a large and extended gradient temperature is needed to change the dimension of the platform. In this instance, the temperature requirements can be relaxed. Temperature modeling can be used to determine suitable temperature requirements.

In operation, the reference plate 508 is positioned on the platform 506, and the marking system (517 in FIG. 5B) is used to form an array of markers on the reference plate 508. The same process is repeated for the transparent substrate 509. The motion of the marking system (517 in FIG. 5B) may be controlled by the computer system 538. The marking system 517 may be an ink marking system or a laser marking system or a scribing system or a lithography tool or any other suitable marking system. After marking, the transparent substrate 509 and reference plate 508 are stacked on the platform 506 to allow an image of the markers on the transparent substrate 509 and the reference plate 508 to the captured, i.e., a first measurement look, using the imaging system 512. Next, the transparent substrate 509 is taken off the platform 506, processed, and then returned to the platform 506 for a second measurement look.

The invention typically provides the following advantages. The relative measurement technique enables dimensional changes of a small or large transparent substrate to be measured with high resolution. The invention includes correcting for errors in measurements due to placement of the transparent substrate relative to the reference plate before and after processing the transparent substrate. The measurements have reduced sensitivity to temperature variations because of the use of a reference plate having a similar CTE to the measured transparent substrate and use of local ruler markings, as opposed to one global reference (0,0,0) typically applied in absolute coordinate measurement system, such as based on interferometry. There is good measurement repeatability and reproducibility over an extended period of measurements. The relative coordinate measurement of marker positions allows travel requirements for the positioning device to be relaxed in comparison to absolute coordinate measurement, which may result in an overall reduction in the cost of the measurement system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of measuring dimensional changes in a transparent substrate, comprising:
    forming an array of reference markers on a reference plate;
    forming an array of substrate markers on the transparent substrate;
    stacking the reference plate and transparent substrate such that the reference markers and substrate markers overlap;
    measuring coordinates of the substrate markers relative to coordinates of the reference markers before and after processing the transparent substrate; and
    determining dimensional changes in the transparent substrate from the difference between the measured relative coordinates of the substrate makers before and after processing the transparent substrate.

2. The method of claim 1, wherein stacking the reference plate and transparent substrate occurs before and after processing of the transparent substrate.

3. The method of claim 2, further comprising compensating for errors in the dimensional changes due to differences in positioning of the transparent substrate relative to the reference plate before and after processing of the transparent substrate.

4. The method of claim 1, wherein stacking the reference plate and transparent substrate comprises offsetting the reference markers from the substrate markers such that the reference and substrate markers are both visible.

5. The method of claim 1, wherein measuring coordinates of the substrate markers comprises obtaining an image of the reference markers and substrate markers.

6. The method of claim 1, wherein stacking the reference plate and transparent substrate comprises locating the reference markers and substrate markers on the same plane.

7. The method of claim 1, wherein stacking the reference plate and transparent substrate comprises locating the reference markers and substrate markers on different planes.

8. The method of claim 1, wherein the array of reference markers is substantially equivalent to the array of substrate markers.

9. The method of claim 1, further comprising supporting the reference plate and transparent substrate on a rigid platform while measuring coordinates.

10. A system of measuring dimensional changes in a transparent substrate on which an array of substrate markers can be formed, comprising:
  a reference plate on which an array of reference markers can be formed and against which the transparent substrate can be stacked;
  a platform providing rigid support to the reference plate;
  an imaging device for capturing images of markers on the reference plate and on the transparent substrate when the transparent plate is stacked against the reference plate;
  a positioning device coupled to the imaging device to place the imaging device at desired locations across the platform; and
  a processing device configured to compute dimensional changes in the transparent substrate from the images captured by the imaging device.

11. The system of claim 10, wherein the reference plate has a similar coefficient of thermal expansion to the transparent substrate.

12. The system of claim 10, further comprising a mechanism for clamping the reference plate to the platform.

13. The system of claim 12, wherein the mechanism comprises one or more passages in the platform which communicate with a surface of the reference plate such that the reference plate is clamped to the platform when the passages are connected to a vacuum source.

14. The system of claim 10, further comprising a mechanism for clamping the transparent substrate to the reference plate.

15. The system of claim 10, further comprising a marking device for forming markers on the reference plate and the transparent substrate.

16. The system of claim 15, wherein the positioning device is coupled to the marking device to place the marking device at desired locations across the platform.

17. The system of claim 10, further comprising a processor which controls motion of the positioning device across the platform.

18. The system of claim 10, wherein the positioning device provides travel along at least two orthogonal directions.

19. The system of claim 10, further comprising one or more illuminators positioned to illuminate markers on the reference plate and transparent substrate.

20. A system of measuring dimensional changes in a transparent substrate, comprising:
  a reference plate;
  a platform providing rigid support to the reference plate;
  an imaging device which captures maces of markers on the reference plate and on the transparent substrate when stacked against the reference plate;
  a positioning device coupled to the imaging device to place the imaging device at desired locations across the platform; and
  a temperature-controlled chamber which encloses a measurement area containing the reference plate and transparent substrate.

* * * * *